United States Patent Office 3,020,244
Patented Feb. 6, 1962

3,020,244
PREPARATION OF HOMOGENEOUS CATALYSTS CONTAINING COBALT OXIDE AND ALUMINUM OXIDE
Edward K. Dienes, Louisville, Ky., assignor to Catalysts and Chemicals, Inc., Louisville, Ky., a corporation of Delaware
No Drawing. Continuation of application Ser. No. 736,988, May 22, 1958. This application May 27, 1959, Ser. No. 816,079
5 Claims. (Cl. 252—465)

This invention relates to the preparation of catalysts suitable for use in the desulfurization of hydrocarbon fractions such as petroleum gas, vapors and liquids, and has special application to the preparation of an improved catalyst containing oxides of cobalt and aluminum.

This application is a continuation of my co-pending application, Serial No. 736,988, filed May 22, 1958, now abandoned.

Most petroleum fractions contain sulfur which is ordinarily present principally in the form of organic sulfur compounds. In many instances the sulfur content in such petroleum fractions is so high as to render them objectionable for sale and for further processing over sulfur-sensitive catalysts. In other instances various distillates are so high in sulfur as to render them objectionable for such uses as cracking stocks or as motor fuels and the like.

Various types of treating methods have been proposed for eliminating sulfur compounds from petroleum distillates. For example, mercaptans which are principally responsible for the objectionable odor, have been converted to less odorous sulfides by a familiar sweetening process such as the doctor treatment. This does not reduce the total sulfur in the distillate and since disulfides are as deleterious in their effects on octane number and lead susceptibility as the parent mercaptans, such processes do not improve the gasoline in these respects.

Other types of treatment have been employed which generally are only effective for mercaptans but not for the refractory ring-type sulfur compounds which generally are the predominating impurity in many stocks. Sulfuric acid has been used and is effective for most types of sulfur compounds; however, such treatment becomes somewhat expensive in stocks containing appreciable proportions of olefins due to the polymerization of said olefins and consequent loss thereof.

The most commonly accepted method of desulfurizing such stocks involves vapor phase catalytic treatment in which organic sulfur compounds are converted to materials which can be removed by simple methods such as caustic scrubbing. Such methods are commonly called hydrodesulfurization or hydrotreating and utilize catalysts comprising the oxides of cobalt and molybdenum distended on activated alumina. Catalysts of this type are extremely rugged and will reduce the organic sulfur and basic and organic nitrogen compounds to an extent suitable for further treatment over the easily poisoned platinum catalysts.

In a single stage desulfurization process, the feedstock is vaporized and mixed with hydrogen and the resulting vapor is passed over a desulfurization catalyst of the type indicated at a temperature between 650 and 850° F. Under these conditions the sulfur compounds present in the feedstock are largely decomposed with the formation of hydrogen sulfide, and when olefins are present, these are largely hydrogenated. The catalyst life between regenerations is long and hydrogen sulfide is present in the product gas throughout almost the entire catalyst life.

Such processing of sulfur-bearing hydrocarbon stocks has long been known as well as the catalyst compositions which are used therein. Early desulfurization procedures involving catalyst compositions containing group 6 and group 8 metal oxides or sulfides were described as early as 1924 Meigs in U.S. Patent 1,467,781 and again in 1930 in British Patent 345,738. In 1932 Krauch et al. in U.S. Patent 1,890,436 disclosed the use of compounds of molybdenum admixed with compounds of iron or cobalt and various carrier substances such as alumina, zinc oxide, magnesia or calcium carbonate. Dorrer in U.S. Patent 1,908,286 disclosed the use of a catalyst containing cobalt sulfide and molybdenum sulfide supported on fuller's earth for the catalytic desulfurization and denitrification of American gas oil and disclosed that alumina gel might be used as a suitable carrier.

At an early date, it was possible with such catalysts, by the use of low space velocities, high pressures, sub cracking temperatures and high hydrogen to hydrocarbon ratios to achieve better than 90% removal of sulfur. However, changing economic conditions in addition to changes in refining operation itself, requiring further treatment of petroleum fractions over expensive and poison-sensitive noble metal catalysts, have dictated the need for better and better hydrodesulfurization catalysts. That need is reflected in the voluminous literature on the subject relative to the preparation of improved catalysts containing oxides of cobalt and molybdenum on alumina, which are by common usage termed cobalt moly or cobalt molybdate catalysts. Such methods may be roughly broken into three major classifications which include precipitation, impregnation and simple mechanical admixture.

Superior catalysts are to some extent dependent upon the surface area, pore size distribution and dispersion of catalytic ingredients upon the carrier substance. Accordingly the catalysts prepared by precipitation or impregnation are generally superior to those prepared by mechanical admixture. Catalysts prepared by wet mixing of the ingredients are superior to those prepared by dry mixing due to the better dispersion of the ingredients. Nevertheless each method has its own inherent disadvantage. For example, catalysts prepared by precipitation of all the ingredients are expensive because of the cost of the metallic salts and reagents, the unit operations involved and the equipment which includes such items as dissolving tanks, precipitation tanks, washing apparatus, filter presses, etc. In the production of cobalt moly catalysts for example, impregnation methods are complicated by the relative insolubility of most cobalt compounds in alkaline solutions and the relative insolubility of most molybdenum compounds in acid solutions. Thus to obtain a suitably stable ammoniacal solution of both cobalt and molybdenum, copious amounts of ammonia must be utilized. Other complexing agents such as citric or malic acid increase the cost of preparing such catalysts. Further, the impregnated catalysts show a tendency of the catalytic constituents to migrate from the pores of the carrier material unless other expensive materials are added to the impregnating solution, thus increasing the cost of production. At best catalysts prepared by dipping calcined carrier pellets into an impregnating solution require two calcinations thus doubling the load on the calcination furnaces and substantially increasing the time schedule for production.

It has been found that a simple and economical method of producing superior catalysts comprises admixing a peptizable hydrated alumina, a compound of a group 6 metal (i.e. chromium, molybdenum or tungsten), and a compound of cobalt with a peptizing agent until a plastic mass is formed due to the peptization of said hydrated alumina. The most suitable peptizing agents agents are those containing a nitrate radical such as nitric acid and acid salts thereof. This method, in addition to producing catalysts of superior activity, also effects considerable economy in time and equipment. Thus, by the judicious selection of raw materials, substantially free of contaminants, the need for washing is eliminated. The need for equipment such as precipitation tanks, impregnation vats, filter presses and thickener-washing apparatus is completely eliminated as well as the time involved in operations in which such items of equipment are used.

It was found upon enlarging the scale of production of such catalysts by this method that the catalysts from batch to batch were non-homogeneous in color and erratic in activity. Whereas catalysts composed of the oxides of cobalt and molybdenum are normally of a bright blue color, the non-homogeneous catalysts were found to be mottled to a greater or lesser extent with splotches of black and the most severely mottled catalysts showed erratic variations in activity. It was noted further that the mottled appearance occurred upon the drying of the extruded pellets which was not ameliorated to any extent by further calcination. Analysis of the mottled catalysts indicated that a portion of the cobalt was present in the trivalent state rather than the divalent state. From this information it was postulated that at least a portion of the cobaltous ion in the undecomposed salt had been oxidized to the cobaltic ion during the drying step. It was noted that when either sulfuric acid or hydrochloric acid was used to peptize the alumina, that the phenomenon of mottling did not occur. However, nitric acid was preferred over sulfuric acid, because of the heat stability of the metallic salts of sulfuric acid. When hydrochloric acid was used the chloride ion was found to be extremely corrosive to stainless steel apparatus such as mix mullers and extrusion apparatus. Consequently nitric acid and the acid salts thereof, such as ammonium nitrate, were found most suitable for the preparation of catalysts by this method. It was further found that the mottling effect occurred when no molybdenum was used in preparing such catalysts.

It is an object of this invention, therefore, to provide a method for the production of cobalt oxide catalysts which are non-mottled and homogeneous in color and which possess high desulfurizing activity.

A further object of this invention is to provide a method of producing homogeneous catalysts comprising cobalt oxide and aluminum oxide in which a peptizing agent with a high oxidizing power is utilized to produce a gel from hydrated alumina containing from 15–35% by weight of combined water in which gel is coagulated by said peptizing agent and dried to a hard, high strength porous catalyst mass.

According to this invention, catalysts are prepared by simply admixing a peptizable hydrated alumina containing from 15–35% by weight of combined water, a compound of cobalt and an organic reducing agent with a peptizing agent having an oxidation power, and mixing the material to effect peptization of the alumina. The plastic admixture may then be formed into various shapes by suitable means such as the well-known extrusions and pelleting techniques. The organic reducing agent may be added after the peptizing step or at any time prior to drying; however, it is normally advantageous for optimum dispersion to premix the raw materials and add the liquid peptizing agent to the admixture.

For the purpose of this invention, organic reducing agents include sugars such as sucrose glucose; starches; organic acids and salts as for example the stearates and palmitates of nickel, copper, chromium, calcium, barium, magnesium, zinc or aluminum; or other normally solid or liquid combustible organic compounds or carbons in the form of graphite, carbon black or charcoal. I have found that these materials are effective in concentrations of as little as 1 mole of carbon per mole of cobalt. Peptizable hydrated alumina may be defined as an alumina which when mixed in the presence of a strong acid, reverts to the structure of a gel and assumes a rubber plastic consistency which upon drying and calcination shrinks into a hard porous mass having exceptional physical strength. Peptizing agents include the radicals of nitric acid which have an acid reaction and possess a high oxidation power. The cobalt constituent is most conveniently and economically obtained by dissolving metallic cobalt in nitric acid; however, other heat decomposable divalent salts of cobalt may be utilized if desired.

Other constituents may be added to the mass to increase or modify the porosity of the resulting catalyst. For example, non-peptizable materials hereinafter termed "grog" with a high surface area such as activated alumina, calcined zirconia, calcined titania, or spent alumina base catalyst may be added in amounts ranging between 0.1 and 1 molecular weight per molecular weight of the hydrated alumina (calculated on the dehydrated basis). Kaolinitic clays such as china clay or ball clay may be added in order to produce the well-known cobalt moly catalyst suitable for the desulfurization of petroleum fractions. Since the cobalt moly catalysts are the most widely used catalysts containing cobalt oxide and aluminum oxide the invention has been described in reference thereto although it should be understood that the invention is not limited to the presence of molybdenum compounds.

Reference is now made to examples of preparation of catalysts containing at least one compound of cobalt and at least one compound of molybdenum although it should be understood that these examples are merely illustrative of this invention.

EXAMPLE 1

Catalysts containing on a final basis 3.5% cobalt oxide, 10.0% molybdenum trioxide and 86.5% alumina were prepared as follows: 200 parts by weight of $MoO_3$, 3 parts by weight of aluminum stearate, 692 parts by weight of grog (calcined alumina) and 1300 parts by weight of hydrated alumina (containing 28% water by weight) were dry mixed in a Simpson mix muller for about ten minutes. A cobalt nitrate solution containing 274 parts by weight of cobalt nitrate dissolved in water was added to the mixture which was then mulled for five more minutes. An aqueous nitric acid solution containing about 13.8 parts by weight of 62% nitric acid was added with an additional 141 parts by weight of hydrated alumina and this mixture was mulled for about ten minutes until a plastic doughy mass was formed which was immediately extruded at ¼ inch by ¼ inch extrusions. These extrusions were dried for three hours at 300° F. and calcined for one hour at 500° F. and for eight hours at 950° F. These extrusions possessed good physical strength and were of a uniform blue color with a density of between forty-two and forty-five pounds per cubic foot. It was found upon calcination that the catalyst had shrunk to about 3/16 inch x 3/16 inch extrusions.

50 cc. of these 3/16 inch extrusions were charged to an isothermal reactor comprising a jacketed iron pipe with an internal diameter of ¾ inch. The catalyst was pretreated by passing hydrogen sulfide through the reactor at a temperature of 700° F. for two hours. Thereafter a Midcontinent diesel fuel containing about 16% organic sulfur and having an end point of about 700° F. was mixed with hydrogen and passed through the reactor at a temperature of 700° F., a pressure of 300 p.s.i.g., a liquid space velocity of 3 and a hydrogen flow rate of 2000 standard cubic feet per barrel. Liquid space velocity is defined as the volumes of liquid passed over each volume of catalyst per hour. The sulfur in the finished product amounted to about 200 parts per million or a conversion of about 87%. Sulfur determinations were made by the method of Hinsvark and O'Hara as reported in Anal. Chem. 29, 1318–22 (1957).

Uniformly blue catalysts made identically to those of this example but utilizing a hydrogenated vegetable stearin as the reducing agent and extruded through a 3/16 inch die (which upon calcination shrunk to 1/8 x 1/8 inch extrusions) were tested in the same manner and with the same Midcontinent diesel fuel. The sulfur content of the treated product was 170 p.p.m., which amounts to a sulfur conversion of about 90%.

EXAMPLE 2

50 cc. of a competitive commercial catalyst in the form of 3/16 inch pellets and containing 3.5% cobalt oxide, 10.0% molybdenum trioxide and 86.5% alumina and having a density of about 60 pounds per cubic foot were tested according to the method and utilizing the same feedstock as that described in Example 1. These catalysts were believed to have been prepared by coprecipitation of alumina and molybdena from a solution of aluminum chloride and ammonium molybdate followed by impregnation with cobalt nitrate of the calcined pellets produced from said precipitate. The sulfur content of the treated product was about 270 parts per million which amounts to about an 83% sulfur conversion.

EXAMPLE 3

50 cc. of the 1/8 inch catalyst pellets prepared by the method of Example 1 were tested by the method described therein except that a Kuwait diesel fuel containing about 1.6% organic sulfur was utilized at a liquid space velocity of about 1.5. At this space velocity the sulfur in the treated product was analyzed at about 0.15% or about a 91% sulfur conversion.

EXAMPLE 4

50 cc. of the commercial catalyst described in Example 2 were tested with the Kuwait diesel fuel of Example 3 at a liquid space velocity of 1.5. The sulfur in the treated product was reduced from the original 1.6% to about 0.23% which amounts to a sulfur conversion of about 86%.

It will be noted even though the catalyst of this invention was much less dense than that of the catalyst of Example 2 that in each case this catalyst showed marked superiority over the catalyst of the other examples. In other words, even with less catalyst on a weight basis in the reactor, a better conversion of the organic sulfur was achieved with the catalyst prepared according to the method of this invention.

These data are tabulated below.

*Table 1*

Conditions:
    Temperature ---------------------------------------------------- 700° F.
    Hydrogen Flow Rate -------------------------------------------- 2000 s.c.f.b.
    Catalyst Composition ------------------------------------------ 3.5% CoO; 10.0% MoO₃; 86.5% Al₂O₃.

| Example No. | 1 | 2 | 3 | 4 |
|---|---|---|---|---|
| Method of Preparation | Peptized | Coprecipitated | Peptized | Coprecipitated. |
| Density in pounds/cubic foot | 42.45 | 58.62 | 42.45 | 58.62. |
| Feedstock | Midcontinent Diesel Fuel. | Midcontinent Diesel Fuel. | Kuwait Diesel Fuel. | Kuwait Diesel Fuel. |
| Pressure, p.s.i.g. | 300 | 300 | 600 | 600. |
| Sulfur Concentration, Percent by Weight | 0.16% | 0.16% | 1.6% | 1.6%. |
| Liquid Space Velocity | 3 | 3 | 1.5 | 1.5. |
| Organic Sulfur Conversion | 87–90% | 83% | 91% | 86%. |

For purposes of comparison, the catalyst composition was held constant in all of the examples. However, as has been pointed out above, the concentration of the catalytic constituents may vary over a relatively wide range. In all of the examples the molecular ratio of cobalt to molybdenum was about 1:1.2. I have found that by holding the cobalt concentration constant and increasing the molybdenum trioxide concentration to about 15% (resulting in a cobalt to molybdenum ratio on the molecular basis of about 1:1.9) that under the conditions of Example 3 the organic sulfur conversion can be increased to about 95%. As a matter of fact, the optimum ratio of cobalt to molybdenum appears to be about 1:5 on a molecular basis. Similarly the molybdenum trioxide may be held constant and the cobalt oxide lowered to produce a less costly catalyst of equivalent activity.

If utilized, the amount of grog added may vary appreciably. As a matter of practice, I have obtained good results with about 25–35% by weight of grog in relation to the total amount of carrier. If the grog exceeds about 50% by weight, the physical strength of the finished catalyst may suffer. If the grog amounts to less than about 10%, the peptized material is buttery and hard to extrude. Furthermore, if insufficient grog is utilized the extruded pellets shrink excessively upon calcination. These properties are dependent to some extent on the nature of the grog. If a plastic material such as kaolin is utilized, the grog may be increased as high as 90%, whereas if a crystalline material such as activated alumina is utilized, the grog should be kept below about 50%. I have found that the addition of kaolin, ball clay or other plastic clay to the mass tends to give the catalyst better heat stability provided that the sodium content of the plastic clay is sufficiently low. It has been found that the sodium content (expressed as Na₂O) in the finished catalyst should not exceed 0.15% and preferably should be in the range of 0.04–0.05% by weight.

The amount of peptizing agent may vary over a wide range. I have obtained good results utilizing from 10 to 20 percent of nitric acid. Mixtures of acids may be utilized and it is sometimes desirable to utilize a minor proportion of an acid of the halogen family to produce a catalyst of greater cracking and isomerization activity. As little as 3% free acid will peptize the mass. However, in this case it has been found that unless the material is worked for a sufficient length of time, a powdery catalyst may result. Normally it is advantageous to utilize a little more acid to cut down the working time.

Obviously many modifications and variations such as may occur to those skilled in the art may be made without departing from the spirit and scope of this invention and, therefore, only such limitations as appear in the appended claims should be imposed.

I claim:

1. A method of preparing porous, hard cobalt oxide-molybdenum trioxide catalyst extrudate containing a major proportion of aluminum oxide as the carrier and having high mechanical strength consisting essentially of the steps of uniformly mixing in the dry state, from about 5–50% by weight of total catalyst of molybdenum oxide, hydrated alumina containing from 15 to 35% by weight of combined water of hydration, and a high surface area crystalline non-peptizable material selected from the group consisting of calcined alumina, calcined zirconia and calcined titania, said crystalline material having a surface area of from 100 to 350 square meters per gram and constituting from about 10% up to about 50% by weight of the finished catalyst, adding to said mixture a water solution of a divalent cobalt salt which is capable of decomposing to cabaltous oxide on heating the catalyst mixture after the extruding step, the amount of cobalt added providing from about 1% to about 5% of cobalt oxide in the finished catalyst, said water solution of said cobalt salt containing at least 3% of free nitric acid and up to about 20% of nitric acid, adding a solid combustible organic reducing agent in an amount of at least one mole of reducing agent per mole of cobalt, expressed as metal, in the finished catalyst, which upon calcining for decomposition of said cobalt salt imparts porosity to the finished catalyst extrudate, mixing the aforesaid ingredients whereby said nitric acid peptizes said hydrated alumina to form a stiff paste, extruding said paste, drying and calcining the extrudate at a temperature up to about 950° F. to decompose said cobalt salt to cobaltous oxide.

2. The method of claim 1 wherein said cobalt salt is cobalt nitrate.

3. The method of claim 1 in which the molar ratio of molybdenum trioxide to cobaltous oxide is about 5 to 1.

4. The method of claim 1 wherein said reducing agent is aluminum stearate present in an amount of about 2–5% by weight of finished catalyst.

5. A porous high strength catalyst prepared by the method of claim 1.

References Cited in the file of this patent

UNITED STATES PATENTS

| | | |
|---|---|---|
| 2,487,466 | Nahin | Nov. 8, 1949 |
| 2,813,837 | Holden | Nov. 19, 1957 |
| 2,830,960 | Broomhead | Apr. 15, 1959 |
| 2,911,374 | Malley et al. | Nov. 3, 1959 |
| 2,913,422 | Reitmeier | Nov. 17, 1959 |